United States Patent
Rychlik et al.

(10) Patent No.: US 7,228,402 B2
(45) Date of Patent: Jun. 5, 2007

(54) PREDICATE REGISTER FILE WRITE BY AN INSTRUCTION WITH A PENDING INSTRUCTION HAVING DATA DEPENDENCY

(75) Inventors: Bohuslav Rychlik, Santa Clara, CA (US); Ryan N. Rakvic, Santa Clara, CA (US); Edward Brekelbaum, Austin, TX (US); Bryan Black, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 10/037,592

(22) Filed: Jan. 2, 2002

(65) Prior Publication Data

US 2003/0135713 A1    Jul. 17, 2003

(51) Int. Cl.
*G06F 9/00*    (2006.01)
(52) U.S. Cl. ................................ 712/217
(58) Field of Classification Search ........... 712/217, 712/219, 228, 216, 218
See application file for complete search history.

(56) References Cited

U.S. PATENT DOCUMENTS

| | | | | | |
|---|---|---|---|---|---|
| 5,179,685 | A | * | 1/1993 | Nojiri | ........................ 712/41 |
| 5,870,581 | A | * | 2/1999 | Redford | ...................... 712/218 |
| 5,933,627 | A | * | 8/1999 | Parady | ........................ 712/228 |
| 6,442,678 | B1 | * | 8/2002 | Arora | .......................... 712/218 |
| 6,513,109 | B1 | * | 1/2003 | Gschwind et al. | .......... 712/200 |
| 6,883,089 | B2 | | 4/2005 | Kling et al. | |
| 2002/0087847 | A1 | | 7/2002 | Kling et al. | |
| 2002/0112148 | A1 | | 8/2002 | Wang et al. | |
| 2005/0027968 | A1 | | 2/2005 | Rupley et al. | |
| 2005/0081017 | A1 | | 4/2005 | Rupley et al. | |

OTHER PUBLICATIONS

Hennessy and Patterson, "Computer Architecture—A Quantitative Approach, 2nd Edition" 1996, pp. 232-234, 240-243, 247, 252, and 254-256.*
Intel, "IA-64 Application Developer's Guide," May 1999, pp. 2-2, 2-4, 2-5, 3-4, 4-7, 4-10, 7-19, 7-20, 7-21, 7-127.*
Hennessy and Patterson, "Computewr Architecture—A Quantitative Approach, $2^{nd}$ Edition," 1996, p. 251.*
Wang, Perry H., et al., "Register Renaming and Scheduling for Dynamic Execution of Predicated Code", The Seventh International Symposium on High-Performance Computer Architecture (HPCA), pp. 15-25 (Jan. 19-24, 2001).

* cited by examiner

*Primary Examiner*—Eddie Chan
*Assistant Examiner*—David J. Huisman
(74) *Attorney, Agent, or Firm*—Matthew C. Fagan

(57) ABSTRACT

A method to handle data dependencies in a pipelined computer system is disclosed. The method includes allocating a plurality of registers, enabling execution of computer instructions concurrently by using the plurality of registers, and tracking and reducing data dependencies in the computer instructions by correlating a busy condition of a computer instruction to each register.

20 Claims, 8 Drawing Sheets

| REGISTER FILE | |
|---|---|
| VALUE | |
| P0 | 1 |
| P1 | 0 |
| P2 | 1 |
| P3 | 1 |
| P4 | 1 |
| P5 | 0 |
| P6 | 0 |
| P7 | 1 |
| ⋮ | |

| SCOREBOARD | |
|---|---|
| BUSY ? | |
| P0 | 0 |
| P1 | 0 |
| P2 | 1 |
| P3 | 0 |
| P4 | 0 |
| P5 | 0 |
| P6 | 1 |
| P7 | 0 |
| ⋮ | |

PREDICATE REGISTER FILE WRITE BY AN INSTRUCTION WITH A PENDING INSTRUCTION HAVING DATA DEPENDENCY

BACKGROUND

The present invention relates to a predicate register file. More particularly, the present invention relates to scoreboarding and renaming such a predicate register file.

Microprocessors often use instruction pipelining to increase instruction throughput. An instruction pipeline processes several instructions through different stages of instruction execution concurrently, using an assembly line-type approach. The pipeline stages are often controlled by predicate registers. One predicate register may be assigned to each stage in the pipeline. All instructions for that stage may then share the same predicate register. Thus, this enables determination of whether the instructions for the stage are executed or not. In other applications, such as Itanium applications, each instruction (referred to as "syllable") has its own "qualifying predicate" that determines whether it executes or not.

However, the performance of pipelined computers may be degraded by data dependencies. A data dependency exists between two instructions if the execution of one depends upon the results of executing the other. Each instruction has the potential to stall later instructions that depend on it.

Accordingly, each of the predicate registers may be associated with a bit which indicates whether the data inside each respective register is either updated and ready to be used, or is being modified or produced and therefore not available. This bit is often referred to as a "scoreboard" bit. For example, if a scoreboard bit for a particular predicate register is set, then the next instruction that needs to access this register cannot execute until the scoreboard bit for this register has been cleared. To clear this register bit, a preceding operation needs to complete execution.

Out-of-order execution may also be used to substantially reduce the effect of stalls due to data dependencies. Upon encountering an instruction that depends on data still in use, the out-of-order execution processor checks for later independent instructions in the program and executes these later instructions before the instruction with dependent data. This reduces the impact of execution stalls because the execution of later independent instructions is overlapped with the execution of instructions requiring multiple clocks to complete.

DETAILED DESCRIPTION

Figure 1:
FIG. 1 illustrates a configuration of a predicate register file with an associated scoreboard.

In recognition of the above-stated challenges associated with prior designs of pipelined computers, the present invention describes embodiments for effectively configuring out-of-order execution processors using predicate registers. Specifically, the present embodiments provide techniques for renaming and scoreboarding predicate registers. Consequently, for purposes of illustration and not for purposes of limitation, the exemplary embodiments of the invention are described in a manner consistent with such use, though clearly the invention is not so limited.

There are three types of data dependencies which may occur in computer programs that degrade the performance of pipelined computers: read-after-write (RAW), write-after-write (WAW), and write-after-read (WAR) dependencies. RAW dependencies occur when an instruction requires the result of a previous instruction. WAW dependencies occur when two instructions write to the same register and therefore the writes must occur in the order specified by the program to guarantee that the subsequent instructions receive the correct value. WAR dependencies occur when an instruction writes to the same register that was read by a previous instruction, and therefore the write must occur after the read to guarantee that the correct value is read. Table 1 shows examples of above described data dependencies that may degrade the performance of pipelined computers.

TABLE 1

| 001 | ADD | r3, | r1, | r2 |
|-----|-----|-----|-----|-----|
| 002 | SUB | r5, | r3, | r4 |
| 003 | SHR | r4, | r6, | r7 |
| 004 | OR  | r3, | r8, | r9 |

In Table 1, the ADD instruction 001 writes to register r3 with the sum of the values in registers r1 and r2. Register r3 is subsequently read by the SUB instruction 002. A RAW dependency exists that prevents the SUB instruction 002 from being executed prior to the ADD instruction 001. The SUB instruction 002 reads register r4 which is subsequently written by the SHR instruction 003. A WAR dependency exists that prevents the SHR instruction 003 from being executed prior to the instruction 002 even though the SHR instruction 003 does not use the result of the SUB instruction 002. Finally, the ADD instruction 001 writes to register r3 which is subsequently written by the OR instruction 004. A WAW dependency exists that prevents the OR instruction 004 from being executed prior to the ADD instruction 001, even though the OR instruction 004 does not use the result of the ADD instruction 001.

The same register will typically be written by multiple instructions during execution of a single program because of the limited numbers of registers in a processor. For example, in Table 1 above, since the OR instruction 004 writes to register r3, a WAW dependency is created with the ADD instruction 001. If the OR instruction 004 uses a register other than r3 as a destination, for example register rD, then the WAW dependency may be substantially reduced. The same reasoning applies to the SHR instruction 003; if the SHR instruction 003 uses a register other than r4 as a destination, then the WAR dependency with the SUB instruction 002 may be substantially reduced. Thus, WAR and WAW dependencies are "false" dependencies created by multiple instructions using the same register as a destination. Therefore, WAR and WAW dependencies may be substantially reduced by constructing a program such that the same register is never written to more than once.

In practice, a technique known as "register renaming" may be used to substantially reduce WAR and WAW dependencies. Table 2 illustrates the instructions from Table 1, before and after register renaming. The virtual register destination of each instruction is renamed to a unique (typically sequential) physical register name (for example rA, rB, etc.) and this new physical name is provided to all subsequent instructions which read the corresponding virtual register. Hence, register renaming may be employed in out-of-order execution processors to reduce WAR and WAW dependencies and therefore increase the number of independent instructions. Renaming may be performed early in the pipeline, prior to execution, so that the instruction issue and execution logic encounter substantially reduced number of WAR or WAW dependencies.

TABLE 2

| Before Renaming | After Renaming |
| --- | --- |
| ADD r3, r1, r2 | ADD rA, r1, r2 |
| SUB r5, r3, r4 | SUB rB, rA, r4 |
| SHR r4, r6, r7 | SHR rC, r6, r7 |
| OR r3, r8, r9 | OR rD, r8, r9 |

An operand copy technique may also be used to handle RAW and WAR dependencies, such as those between the ADD and the SUB instructions in Table 1. Using this technique, ready source operands of an instruction are copied into the reservation station before the instruction enters the out-of-order issue window. The instruction may then wait for issue while input operands are kept safely in the reservation station. Hence, combination of operand copy technique with register renaming may be used to handle all three types of dependencies.

In some implementations, full register renaming with tag-based forwarding is used. This technique is a substantially more complex combination that addresses all three types of dependencies substantially simultaneously. The technique may be implemented by allocating a new physical register (and a tag) for each dynamic register definition. Because it allocates a new register for each write, WAW dependency stalls are substantially reduced. However, this technique requires the use of a renaming table with an entry for each register, and additional rename registers. This type of full individual register renaming technique is currently used in Pentium processors.

"Register scoreboarding", which is used in Itanium processors, is a technique that may handle RAW and WAW dependencies by stalling instructions. A scoreboard is maintained for the registers that indicates (using busy bits) whether a register is waiting on a pending write from a previously dispatched instruction that has not yet finished executing. Subsequent reads and writes to the same register are stalled until the register is no longer busy and these instructions issue in-order. For example, Itanium is an in-order issue processor, which uses the scoreboard to ensure that RAW dependencies are enforced. Hence, the processor stalls not only the dependent instruction but all subsequent instructions. However, instructions that operate on other registers may issue out-of-order.

Figure 2:
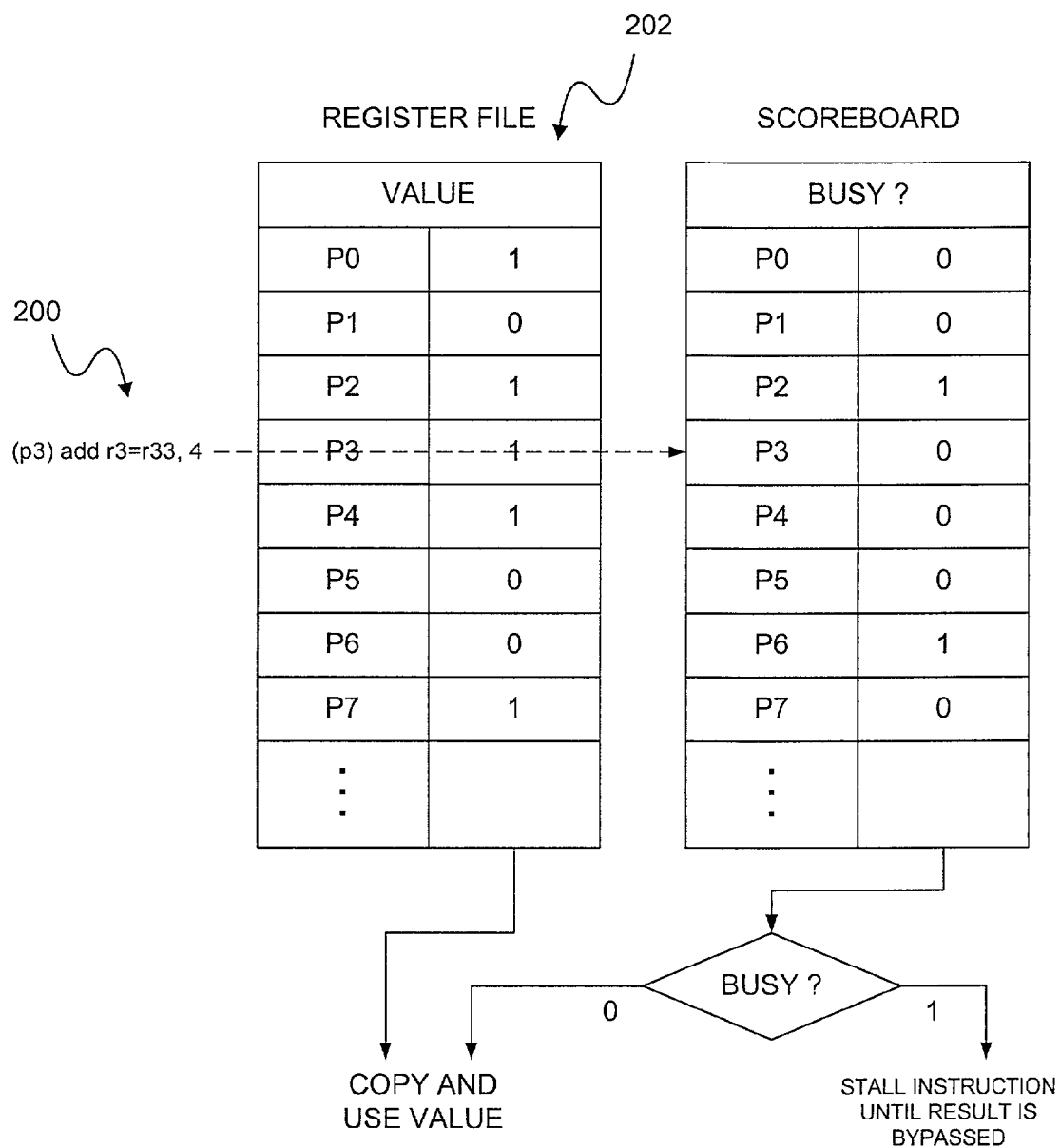
FIG. 2 illustrates another configuration of a predicate register file in a predicate read with operand copy mode.

One configuration of a predicate register file 100 with an associated scoreboard 102 is illustrated in FIG. 1 in accordance with an embodiment of the present invention. The scoreboard 102 has a busy bit for each register. A predicate-reading instruction 200 then checks the busy bit for its source predicate, as shown in FIG. 2. This may happen either before or after the execution as long as instructions reading the same predicate register 202 check the bit in-order. If the busy bit is null, the instruction 200 may safely copy and use the value in the predicate register 202. Otherwise, the instruction 200 must stall until the result is bypassed.

Figure 3A:
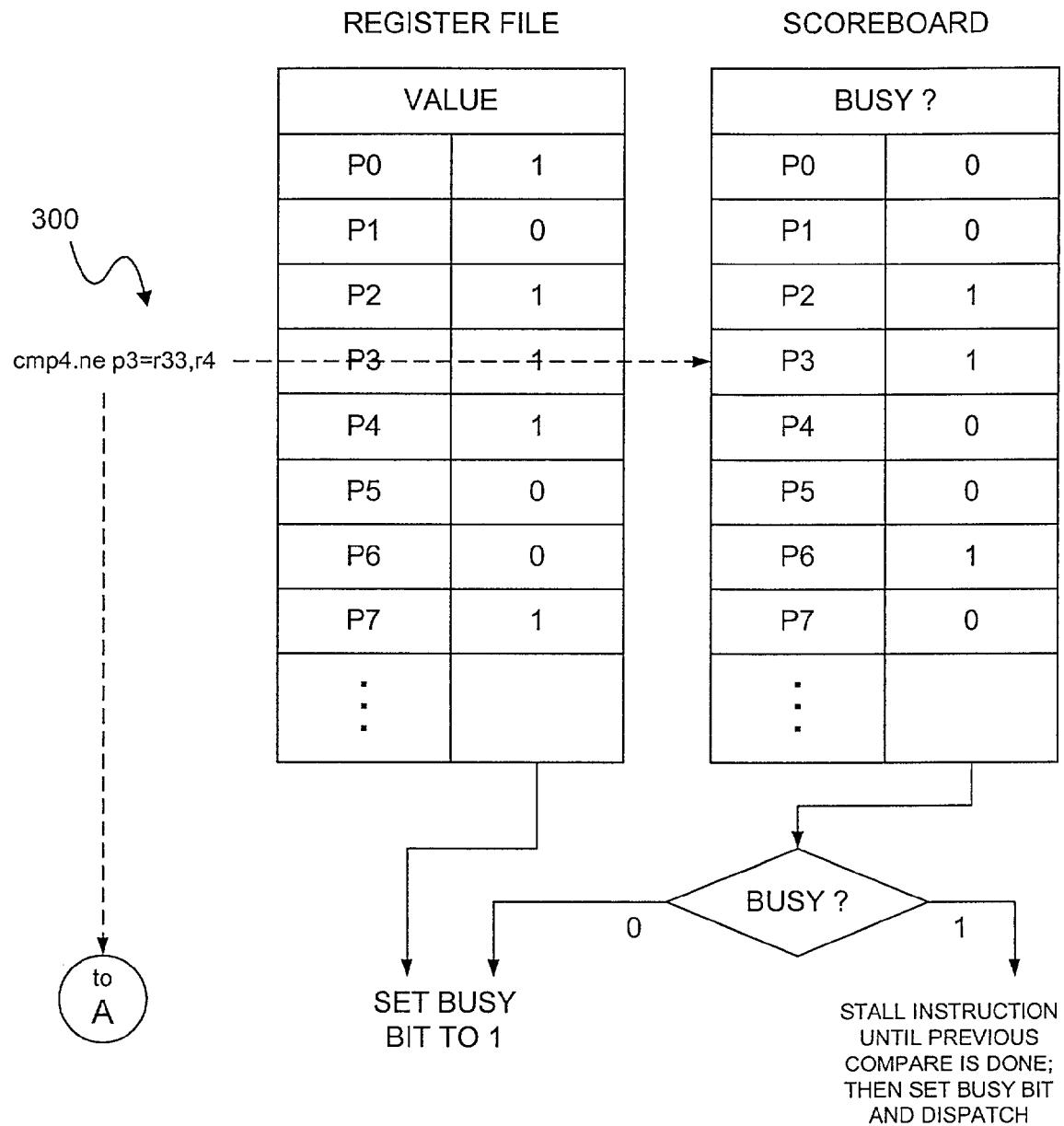
FIG. 3A illustrates a configuration of a predicate register file in a predicate write instruction dispatch mode.
Figure 3B:
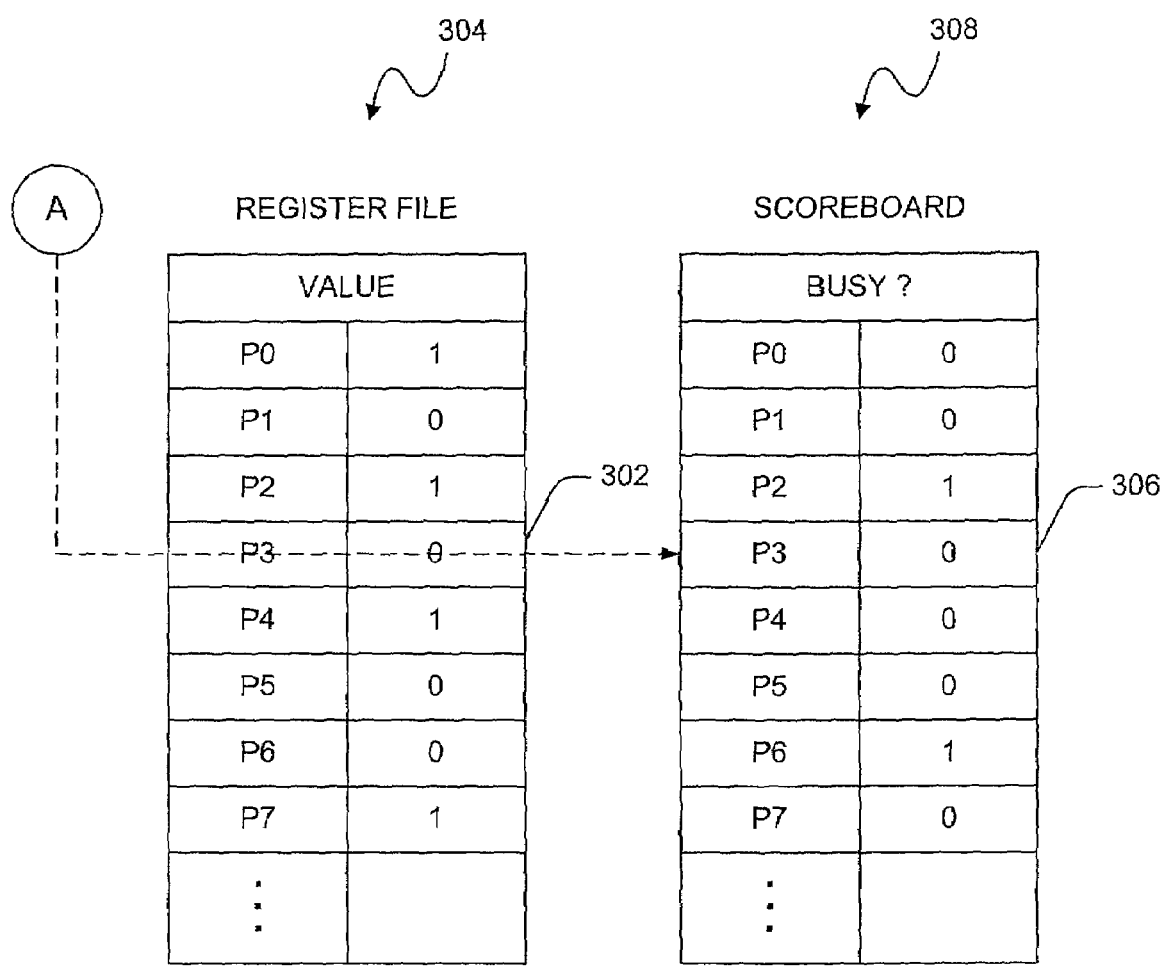
FIG. 3B illustrates a configuration of a predicate register file in a predicate write instruction completion mode.

A predicate-writing instruction (e.g., a compare) 300 may also check the busy bit for its destination predicate(s). If the busy bit is null, the instruction 300 may set the bit. Otherwise, the instruction 300 must stall as shown in FIG. 3A. When the predicate-writing instruction 300 is done, the instruction 300 may write the result 302 into the predicate register file 304 and clear its busy bit 306 in the scoreboard 308 (see FIG. 3B).

As described above, register renaming of the present embodiments is configured to change the name of the destination register of all instructions from the name assigned by the high-level language compiler (typically referred to as virtual registers) to a unique name in another namespace (typically referred to as physical registers). For example, in an out-of-order Itanium processor implementation, dynamic register renaming is employed to reduce stalls due to WAR and WAW dependencies. However, general purpose renaming on a register-by-register basis adds implementation complexity that may be undesirable in many cases.

In the Itanium processor implementation, for example, the predicate register file has a size and access pattern that enables use of a simpler form of renaming. In this implementation, the total predicate register file size is only 63 bits. Thus, conservation of rename register entries is not as important for the rename scheme as it is with, for example, the general purpose integer register file (which is 128 times larger). Furthermore, the predicate register file is written substantially less often than the integer register file because only compare and move-to-predicate register instructions write to the predicate register file. The compare instructions only write individual predicate bits and do not typically induce WAW dependencies between each other because they write to different predicates. However, the move-to-predicate instructions may change all the predicate bits. Moreover, the move-to-predicate instructions are output dependent (WAW) on all previous compares. These outcomes may cause subsequent compares to induce WAW dependencies. Therefore, the move-to-predicate instruction and all subsequent compares, without predicate renaming, must stall to observe any WAW dependencies caused by previous pending compares.

Accordingly, the present embodiments provide register scoreboarding and renaming with operand copy technique to handle all data dependencies in the predicate register file. Specifically, the embodiments enable a form of renaming on the level of entire predicate register file, which takes advantage of the specific characteristics and usage patterns of the predicate register file. Thus, renaming of individual predicate bits may not be desirable. Instead, a scoreboard is used to enforce stalls of compare instructions due to WAW dependencies on individual predicate bits (when a previous compare instruction writing the same predicate register bit is still pending or executing) and operand copy of predicate bits is used to avoid WAR dependencies (when a register is overwritten by a later instruction before it has been read by an earlier instruction).

These known techniques are effective for predicates because WAW dependencies on individual predicate bits rarely occur to cause much stall, particularly in architectures with many predicate registers where compilers may be tuned to avoid WAW dependencies. Furthermore, since a predicate is a single bit, operand copy costs minimal extra storage. However, when move-to-predicate register instructions (or similar instructions that write the entire 64-bit predicate register file at once) are encountered that are likely to cause stalling due to WAW dependencies, the entire predicate register file may be renamed as one unit. Note that the length of the predicate register file (e.g. 64 bits) may vary depending on the implementation.

The present embodiments are implemented with structures that are added to the existing scoreboard and architected registers. In these embodiments, the predicate register file (along with its scoreboard) is copied to create renamed predicate register files. For an all-predicates writing instruction, the scoreboard need not be copied, since all scoreboard bits are set to 'busy'. Since each predicate register occupies only one bit, duplicating the entire predicate register file is less costly than duplicating the general purpose or floating-point register files. For example, in the Itanium processor, the entire predicate register file is only 63 bits. Additional 63 bits are used for scoreboarding. Accordingly, a plurality of predicate register files, each file having multiple predicate registers, may be used to provide register renaming in these embodiments.

Figure 4:
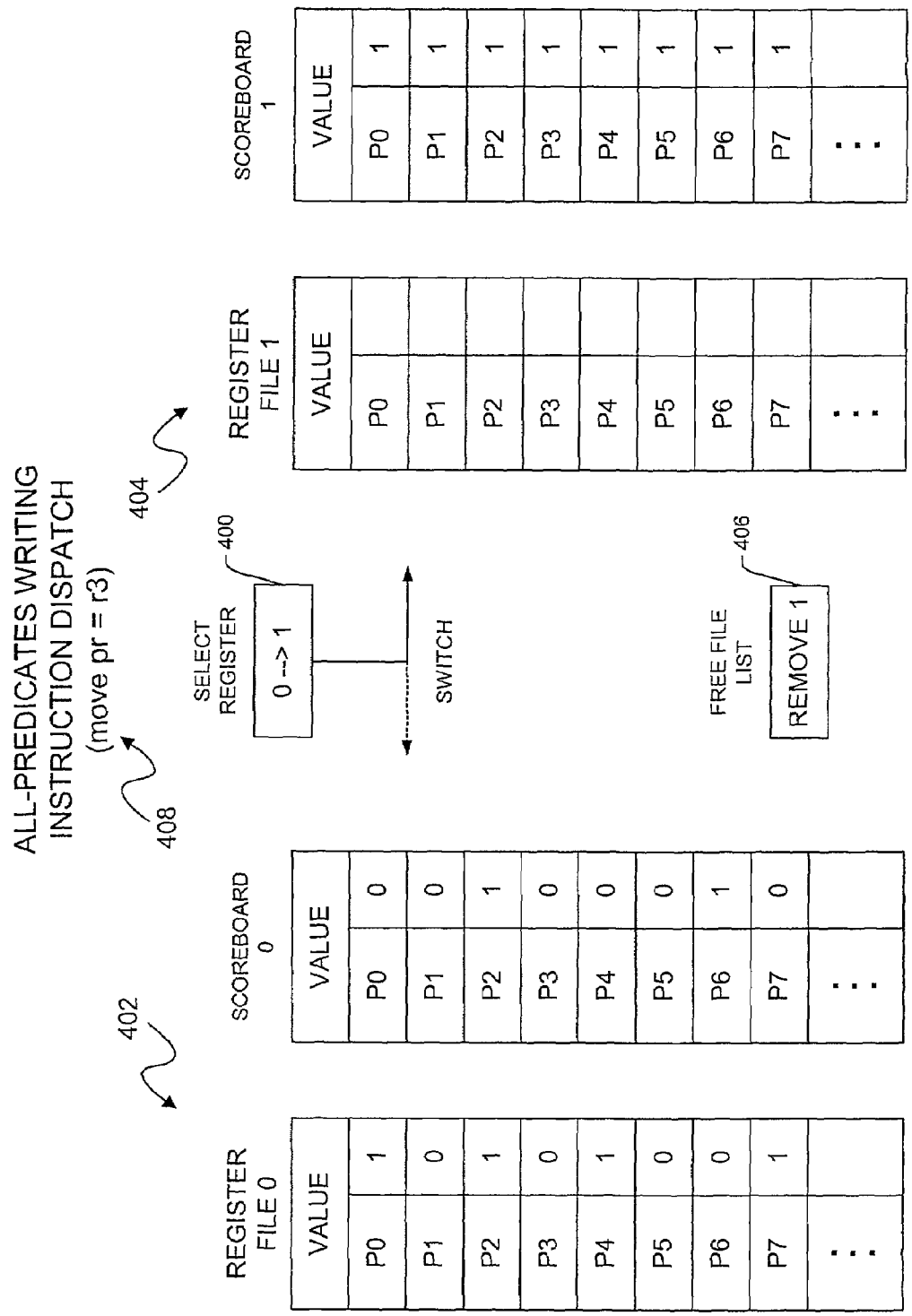
FIG. 4 illustrates one instance of a technique to handle data dependencies using a plurality of predicate register files in accordance with an embodiment of the present invention.

FIG. 4 illustrates a technique to handle data dependencies using a plurality of predicate register files 402, 404 in accordance with an embodiment of the present invention. In the illustrated embodiment, when an all-predicates writing instruction (e.g., move-to-predicate-register) 408 is encountered, an entire new predicate register file 404 is allocated. Allocation of a new predicate register file 404 is accomplished by appropriately adjusting a predicate register file select register 400 to point to the new predicate register file 404, and removing the predicate register file 404 from a free file list 406.

The select register 400 may serve the same function as the rename map in general register renaming. However, the select register 400 operates at the predicate register file level, rather than the individual register level. The select register 400 holds the index to the currently selected predicate register file 404, and needs enough bits to point to all rename predicate register files 402, 404. If no new predicate register file is available, the instruction stalls. In one embodiment, the select register 400 includes a pointer.

The free file list 406 is a pointer to the next free predicate register file 404. The pointer may be implemented as a list of free predicate register files, a set of head and tail pointers, or other appropriate implementation. Hence, when a renamed predicate register file 404 is allocated, the file 404 is removed from the free file list 406. When the file 404 is de-allocated, the file 404 is added to the free file list 406 again. In one embodiment, the free file list 406 includes a pointer. In another embodiment, the free file list 406 includes a stack.

Figure 5:
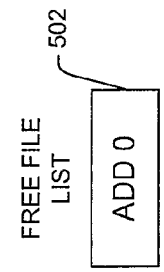
FIG. 5 illustrates another instance of a technique to handle data dependencies using a plurality of predicate register files in accordance with an embodiment of the present invention.
Figure 5:
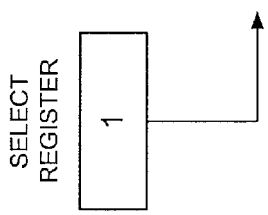

The all-predicates writing instruction 408 uses the newly-allocated predicate register file 404 as a destination for the instruction 408. Thus, the instruction 408 does not have to check or stall for any WAW dependencies due to pending predicate writes because it has its own free predicate register file 404. Any pending writes may write to the previously selected predicate register file 402. This may occur simultaneously or out of order with the all-predicates write to the newly allocated predicate register file 404. The previously selected predicate register file 402 may be de-allocated when the all-predicates writing instruction is committed in-order. De-allocation may be accomplished by indicating that the file 500 is free in the free file list 502 as shown in FIG. 5. This ensures that all previous pending writes and reads have occurred.

In an alternative embodiment, when an all-predicates writing instruction is encountered, the processor may determine if there are any pending writes (e.g., busy bits set) in the currently selected predicate register file. This may be done by OR-ing the busy bits of the selected predicate register file's scoreboard. If no busy bits are set, then no new predicate register file needs to be allocated since no WAW dependencies exist. This may conserve the use of the predicate register files at the cost of performing the WAW check. If any of the busy bits are set, a new predicate register file may be allocated in the same manner as in the illustrated embodiment of FIG. 4. Hence, the processor does not have to stall for any WAW dependencies.

In both embodiments discussed above, all other predicate access instructions read and write the predicate register file that was selected when they accessed the predicates by reading the predicate register file select register (either when dispatched in-order into the out-of-order issue window or during in-order commit). The instruction may then execute effectively out-of-order with respect to each other as long as they access different predicates and strictly out-of-order with instructions assigned to a different predicate register file regardless of the predicates. Moreover, due to the negligible number of WAW dependencies on individual predicate writes and the handling of all-predicates instructions through predicate register file renaming, only true dependencies and functional unit resource may limit execution of predicate-writing instructions.

When a new renamed predicate register file is allocated due to an all-predicates writing instruction, and that instruction is not able to execute immediately, all of the individual busy bits in the new scoreboard must be set. While this may be done ahead of time (since all new rename predicate register files may initially have all the bits set upon allocation), all of the bits must also be cleared when the all-predicates writing instruction has finished executing. In one embodiment, a single additional All Busy bit may be added to the scoreboard to indicate that all the predicates are busy. An all-predicates writing instruction then simply sets and clears this bit when it dispatches and finishes. All predicate accessing instructions then check the All Busy bit in addition to the busy bit for the individual predicate register being accessed to determine WAW and RAW dependencies.

Figure 6:
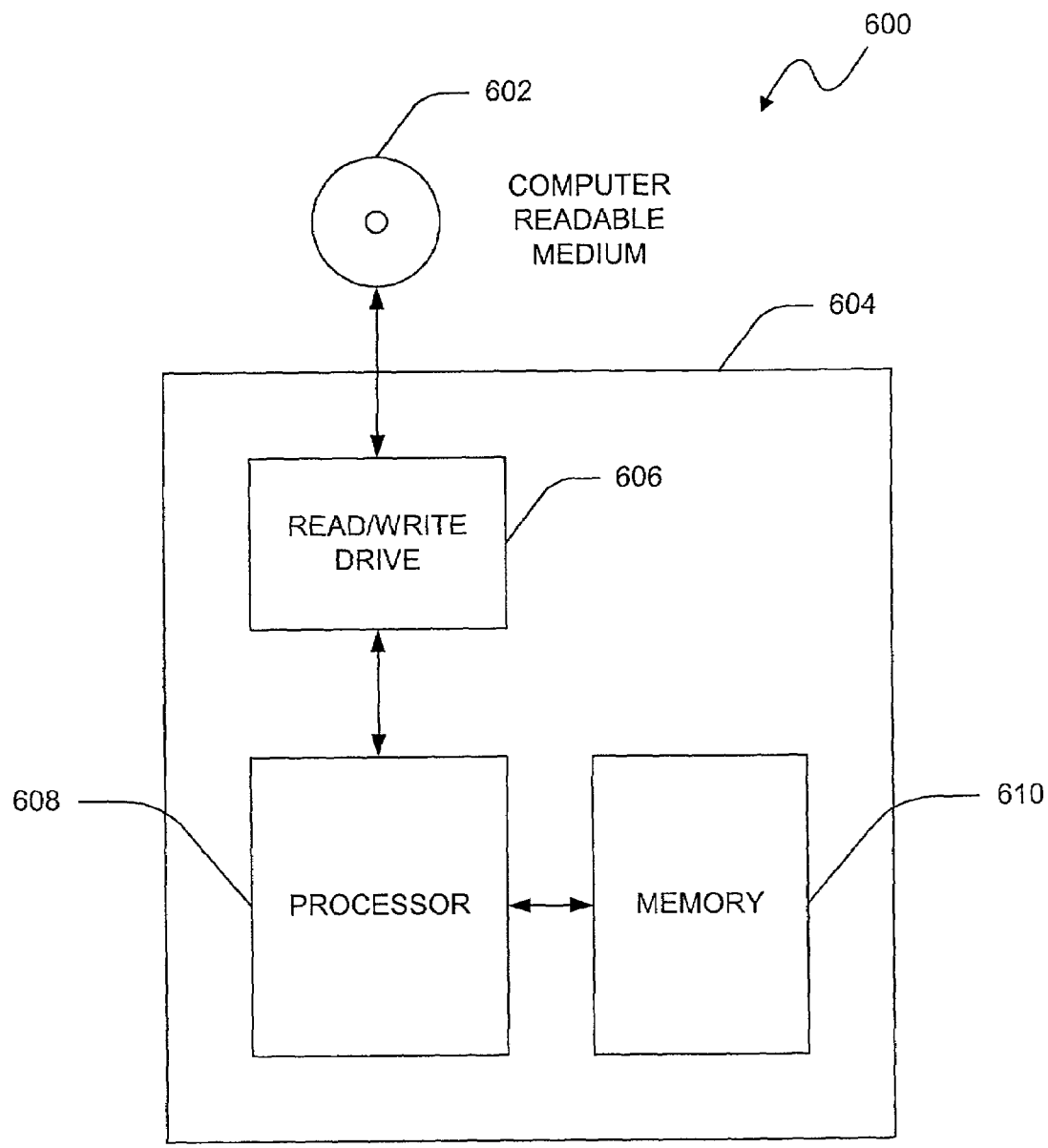
FIG. 6 is a block diagram of a processor-based system which may execute codes residing on the computer readable medium.

FIG. 6 is a block diagram of a processor-based system 600 which may execute codes residing on the computer readable medium 602. The codes are related to the techniques for renaming and scoreboarding predicate registers to handle data dependencies in the pipelined computers described above in conjunction with FIGS. 1 through 5. In one embodiment, the computer readable medium 602 may be a fixed medium such as read-only memory (ROM) or a hard disk. In another embodiment, the medium 602 may be a removable medium such as a floppy disk or a compact disk (CD). A read/write drive 606 in the computer 604 reads the code on the computer readable medium 602. The code is then executed in the processor 608. The processor 608 may access the computer memory 610 to store or retrieve data.

Figure 7:
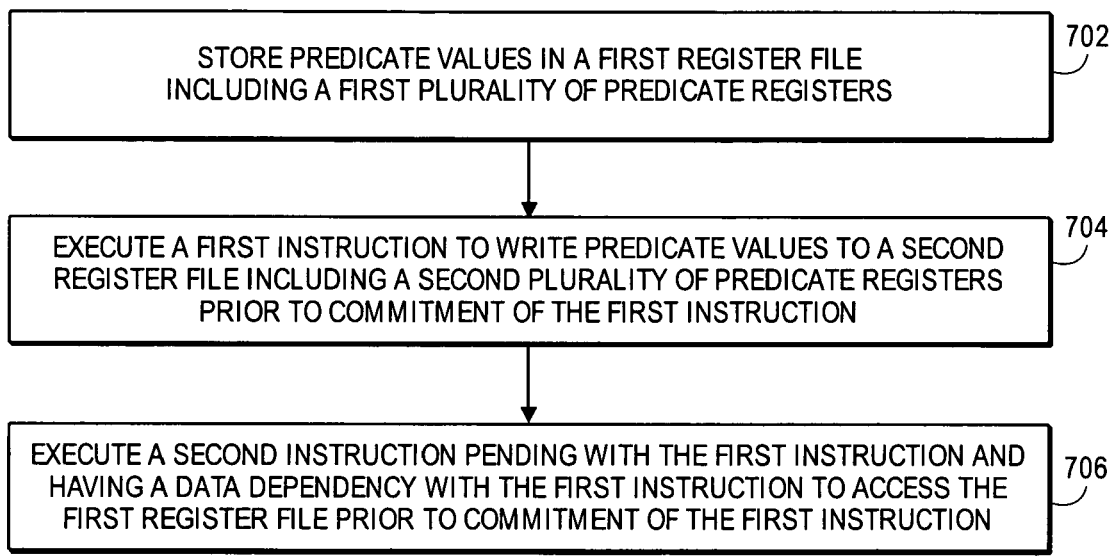
FIG. 7 illustrates a technique to handle a data dependency using two predicate register files.

FIG. 7 illustrates a technique to handle a data dependency using two predicate register files. As illustrated in FIG. 7, predicate values may be stored in a first register file including a first plurality of predicate registers for block 702. A first instruction may be executed to write predicate values to a second register file including a second plurality of predicate registers prior to commitment of the first instruction for block 704. A second instruction pending with the first instruction and having a data dependency with the first instruction may be executed to access the first register file prior to commitment of the first instruction for block 706. Execution of the second instruction for block 706 may occur simultaneously or out of order with execution of the first instruction for block 704.

There has been disclosed herein embodiments for renaming and scoreboarding predicate registers to handle data dependencies in the pipelined computers. Specifically, the present embodiments include allocating an entire new predicate register file when an all-predicates writing instruction is encountered. Allocation of a new predicate register file is accomplished by appropriately adjusting the select register to point to the new predicate register file, and removing the file from the free file list.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. For example, although the present technique is described in terms of using the select register in conjunction with the free file list, other similar components such as a select bit in a stack may be used to provide similar functions. In other instances, well-known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a processor to store predicate values in a first register file including a first plurality of predicate registers,
the processor to execute a first instruction to write predicate values to a second register file including a second plurality of predicate registers prior to commitment of the first instruction,
the processor to execute a second instruction pending with the first instruction and having a data dependency with the first instruction to access the first register file prior to commitment of the first instruction.

2. The apparatus of claim 1, wherein the processor is to maintain a select register to identify a selected register file.

3. The apparatus of claim 1, wherein the processor is to allocate the second register file to execute the first instruction.

4. The apparatus of claim 3, wherein the processor is to maintain a free file list to identify a register file to be allocated.

5. The apparatus of claim 1, wherein the processor is to deallocate the first register file.

6. The apparatus of claim 1, wherein the processor is to copy predicate values from the first register file to the second register file.

7. The apparatus of claim 1, wherein the processor is to maintain a scoreboard to identify any predicate values in the first register file to be written by a pending instruction.

8. The apparatus of claim 1, wherein the processor is to stall a third instruction with which a pending instruction to write a predicate value to the first register file has a data dependency.

9. The apparatus of claim 1, wherein the processor is to write to the second register file in response to the first register file having a predicate value to be written by a pending instruction.

10. A method comprising:
storing predicate values in a first register file including a first plurality of predicate registers;
executing a first instruction to write predicate values to a second register file including a second plurality of predicate registers prior to commitment of the first instruction; and
executing a second instruction pending with the first instruction and having a data dependency with the first instruction to access the first register file prior to commitment of the first instruction.

11. The method of claim 10, comprising allocating the second register file to execute the first instruction.

12. The method of claim 10, comprising deallocating the first register file.

13. The method of claim 10, comprising copying predicate values from the first register file to the second register file.

14. The method of claim 10, wherein executing a first instruction comprises writing to the second register file in response to the first register file having a predicate value to be written by a pending instruction.

15. A computer readable medium having code to cause a processor to:
store predicate values in a first register file including a first plurality of predicate registers;
execute a first instruction to write predicate values to a second register file including a second plurality of predicate registers prior to commitment of the first instruction; and
execute a second instruction pending with the first instruction and having a data dependency with the first instruction to access the first register file prior to commitment of the first instruction.

16. The medium of claim 15, wherein the medium has code to cause the processor to copy predicate values from the first register file to the second register file.

17. The medium of claim 15, wherein the medium has code to cause the processor to write to the second register file in response to the first register file having a predicate value to be written by a pending instruction.

18. A system comprising:
a processor to store predicate values in a first register file including a first plurality of predicate registers, the processor to execute a first instruction to write predicate values to a second register file including a second plurality of predicate registers prior to commitment of the first instruction, the processor to execute a second instruction pending with the first instruction and having a data dependency with the first instruction to access the first register file prior to commitment of the first instruction; and
a disk drive coupled to the processor.

19. The system of claim 18, wherein the processor is to copy predicate values from the first register file to the second register file.

20. The system of claim 18, wherein the processor is to write to the second register file in response to the first register file having a predicate value to be written by a pending instruction.

* * * * *